(12) United States Patent
Kane et al.

(10) Patent No.: US 6,245,127 B1
(45) Date of Patent: Jun. 12, 2001

(54) PRESSURE SWING ADSORPTION PROCESS AND APPARATUS

(75) Inventors: Michael Scott Kane, Geltzville; Frederick Wells Leavitt, Amherst; Mark William Ackley, East Aurora; Frank Notaro, Amherst, all of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/320,692

(22) Filed: May 27, 1999

(51) Int. Cl.$^7$ ................................................ B01D 53/053
(52) U.S. Cl. ........................ 95/101; 95/105; 95/139; 96/115; 96/130; 96/143
(58) Field of Search ................ 95/96–98, 100–105, 95/139; 96/109, 115, 130, 143, 144

(56) References Cited

U.S. PATENT DOCUMENTS

| | | | |
|---|---|---|---|
| 2,882,243 | * | 4/1959 | Milton .................................. 252/455 |
| 2,882,244 | * | 4/1959 | Milton .................................. 252/455 |
| 4,599,094 | | 7/1986 | Werner et al. ........................... 55/26 |
| 4,723,966 | | 2/1988 | Fuderer .................................... 55/25 |
| 4,775,394 | * | 10/1988 | Yamano et al. .................... 95/139 X |
| 4,810,265 | | 3/1989 | Lagree et al. ............................ 55/26 |
| 4,840,647 | | 6/1989 | Hay ......................................... 55/26 |
| 4,892,565 | | 1/1990 | Schmidt et al. ......................... 55/26 |
| 4,963,339 | * | 10/1990 | Krishnamurthy et al. ........... 423/437 |
| 5,026,406 | | 6/1991 | Kumar .................................... 55/26 |
| 5,032,150 | | 7/1991 | Knaebel ................................. 55/20 |
| 5,133,785 | * | 7/1992 | Kumar et al. ..................... 95/139 X |
| 5,137,549 | * | 8/1992 | Stanford et al. .................. 95/139 X |
| 5,248,322 | | 9/1993 | Kumar .................................. 95/101 |
| 5,354,346 | | 10/1994 | Kumar .................................. 95/101 |
| 5,370,728 | | 12/1994 | LaSala et al. ......................... 95/101 |
| 5,415,683 | | 5/1995 | Leavitt ................................. 95/101 |
| 5,531,808 | * | 7/1996 | Ojo et al. .......................... 95/139 X |
| 5,565,018 | * | 10/1996 | Baksh et al. ........................ 95/100 |
| 5,669,960 | | 9/1997 | Couche ................................. 95/96 |
| 5,702,504 | * | 12/1997 | Schaub et al. ....................... 95/101 |
| 5,735,938 | * | 4/1998 | Baksh et al. ......................... 95/101 |
| 5,755,856 | * | 5/1998 | Miyake et al. .................... 95/102 X |
| 6,007,606 | * | 12/1999 | Baksh et al. ...................... 95/139 X |
| 6,045,603 | * | 4/2000 | Chen et al. ....................... 95/100 X |
| 6,048,384 | * | 4/2000 | Smolarek ............................... 95/98 |

* cited by examiner

*Primary Examiner*—Robert H. Spitzer
(74) *Attorney, Agent, or Firm*—Robert J. Follett

(57) ABSTRACT

A low pressure swing adsorption process and apparatus for the recovery of carbon dioxide from multi-component gas mixtures, utilizing the simultaneous purge and evacuation of opposite ends of the adsorber(s) to effect controlled depressurization in the adsorber bed(s) to maintain the constant purity of a carbon dioxide-enriched product stream recovered from the adsorber inlet(s).

20 Claims, 9 Drawing Sheets

PRESSURE SWING ADSORPTION PROCESS AND APPARATUS

BACKGROUND OF THE INVENTION

1. Field of the Invention

This invention relates to an improved pressure swing adsorption process and apparatus for recovery of the more strongly adsorbed gas component in a multi-component gas mixture. More particularly, it relates to such a process and apparatus for the recovery of carbon dioxide from streams containing more weakly adsorbed components such as nitrogen, oxygen, hydrogen, methane, and carbon monoxide.

2. Description of the Prior Art

High-purity liquid carbon dioxide (99.99+%) is commonly produced by direct liquefaction of gas streams containing in excess of 95% $CO_2$. These high-concentration sources are available directly as by-product streams from chemical processes such as ammonia synthesis. As a result, location of carbon dioxide liquefaction plants is traditionally dictated by the location and availability of these sources.

Many carbon dioxide customers do not require 99.99+% purity of liquefied $CO_2$. Applications such as pH control and carbonate production can be effectively serviced with gaseous $CO_2$ ranging in purity from 80% to 90%. Frequently, the sites where lower purity gaseous $CO_2$ is needed have alternative sources of low concentration $CO_2$ available, i.e., typically containing less than 20% $CO_2$. Consequently, there is an opportunity for new technologies that are capable of economical on-site $CO_2$ production from low-grade sources such as flue gas from boilers or other combustion sources.

Various methods for $CO_2$ recovery from low and intermediate concentration sources are known. Chemical absorption of $CO_2$ from a multi-component gas stream into a liquid absorbent, followed by heating to strip the $CO_2$ from solution, is used to recover gaseous $CO_2$ at 99+% purity. A variety of liquid amines, or potassium carbonate, can be used as the absorbent medium. The primary disadvantages of these processes are significant energy requirements for thermal regeneration of the absorbent, and reduction in absorbent capacity when modest quantities of oxygen are present in the multi-component gas stream.

Membrane separation processes may also be used for $CO_2$ recovery, but these processes often require high feed pressures to achieve modest permeability for $CO_2$. Expensive multi-staged membrane processes are needed for production of high purity $CO_2$ from low concentration sources such as flue gas.

Pressure swing adsorption (PSA) separations offer significant potential advantages as compared with other methods for $CO_2$ recovery. Thus, PSA offers the potential for lower-cost concentration and delivery of $CO_2$ in comparison with the more traditional method of liquefaction and transportation of liquid $CO_2$, particularly when transportation costs are high or attractive feed stocks for $CO_2$ liquefaction are unavailable. A further and primary advantage of PSA techniques is the flexibility to produce $CO_2$ product at variable purity. Adsorption and desorption pressures can be tuned, along with other process parameters, to yield the minimum desired product purity for a particular application. This allows power requirements to be reduced when high-purity product is not needed. A similar reduction in power consumption is difficult to achieve with liquid absorption processes since thermal stripping of the absorbent will always yield product at 99+% purity. PSA does not require a high temperature energy source like steam for regeneration, as do absorption processes. As a result, PSA is an attractive alternative for locations where steam is unavailable or expensive. In general, adsorptive separation is a reliable, flexible and potentially lower cost method for recovery of $CO_2$, particularly when gas-phase purity in excess of 99% is not required.

For $CO_2$ production from combustion flue gas, lime kiln off-gas, $H_2$ plant tail gas and other sources, the function of the primary adsorbent(s) is to selectively adsorb $CO_2$ while allowing lighter components to pass through. Water, which is typically more strongly adsorbed than $CO_2$, may be present but can be effectively removed in a pretreatment layer of adsorbent. Therefore, the production of $CO_2$ using PSA requires processes that are effective for heavy component recovery, that is, for recovery of the more strongly adsorbed component in a multi-component mixture.

A number of PSA processes for heavy component recovery, including the production of $CO_2$ from low concentration sources, have been described in the prior art. See, for example, the following U.S. patents: Werner et al. U.S. Pat. No. 4,599,094; Fuderer U.S. Pat. No. 4,723,966; Lagree et al. U.S. Pat. No. 4,810,265; Hay U.S. Pat. No. 4,840,647; Schmidt et al. U.S. Pat. No. 4,892,565; Krishnamurthy et al. U.S. Pat. No. 4,963,339; Kumar U.S. Pat. No. 5,026,406; Knaebel U.S. Pat. No. 5,032,150; Kumar U.S. Pat. Nos. 5,248,322 and 5,354,346; LaSala et al. U.S. Pat. No. 5,370,728; Leavitt U.S. Pat. No. 5,415,683; and Couche U.S. Pat. No. 5,669,960. The most common applications for heavy component recovery are $N_2/O_2$ separation utilizing zeolite adsorbents, and $CO_2/N_2$, $CO_2/CH_4$ and $CO_2/H_2$ separations utilizing zeolites, activated carbons, silica gel or other adsorbents. Typically, prior art processes rely on compression of the feed to an elevated adsorption pressure, evacuation to recover heavy component product and rinsing with heavy component. Prior art processes typically use multiple beds to insure continuous utilization of equipment, with surge tanks used to dampen fluctuations in product flow and purity. Prior art processes for heavy component recovery, or combined light and heavy component recovery, can be divided into three general classes: conventional cycles, inverted cycles and reflux cycles. In a conventional cycle, adsorption occurs at higher pressure, with purging and recovery of heavy component product taking place at lower pressure. In an inverted cycle, adsorption occurs at lower pressure, with purging at a higher pressure. Each adsorbent bed in a reflux cycle contains a conventional bed portion and an inverted bed portion, with reflux of light and heavy component between beds. The advantage of the reflux cycle is that both light and heavy component products can be recovered at high purity and high recovery. However, this process is energy intensive and unattractive if recovery of the light component is not desired. The inverted cycle can be used to recover heavy component product at high purity, but requires significant power consumption. A conventional cycle may consume less power, but heavy component product purity varies throughout the cycle. An additional disadvantage of the inverted cycle is that it requires removal of water or other heavy components in a separate vessel before the feed enters the main adsorbent vessels. The individual steps in conventional PSA cycles are well known in the prior art. The first step in the basic cycle is adsorption, in which a multi-component feed gas is passed to the adsorbent bed at an elevated adsorption pressure. During this step the more selectively adsorbed component is retained by the adsorbent while the gas phase is enriched in less selectively adsorbed components. Typically, the adsorption step is terminated before the mass transfer front reaches the outlet of the adsorbent bed. Following adsorption, the adsorber vessel is depressurized via countercurrent blowdown and/or evacuation. As the pressure is reduced the gas phase becomes enriched in heavy component. At least a portion of the gas evolved during the depressurization stages is taken as heavy component product. Following depressurization, the adsorber vessel is repressurized to the adsorption pressure and the cycle is repeated. The basic cycle may be modified to include rinsing of the bed with heavy component product between adsorption and depressurization stages. This displaces a portion of the non-adsorbed gas from the bed and provides increased recovery of the heavy component product. The cycle may also include purging at intermediate or low pressures to further regenerate the adsorbent before the cycle is repeated.

Many of the potential on-site applications for gaseous $CO_2$ are relatively small, e.g. less than 30 tons/day of contained $CO_2$ product. On-site $CO_2$ plants as small as 1 to 5 tons/day can be envisioned. This small plant size dictates the need for processes that are simple, reliable, and minimize process flow sheet complexity—and hence minimize capital cost. As plant size decreases, even relatively modest capital expenditures and fixed costs can add significantly to the unit production cost. The capital cost penalty for prior art processes with four or more beds, and associated valves, is significant when plant capacity is very small. The use of expensive surge tanks to dampen fluctuations in product purity adds additional cost to the process. Adsorption at elevated pressure, as in many prior art techniques, requires the compression of large amounts of the light (waste) components; this adds particular energy expense in recovering $CO_2$ from dilute gas mixtures such as combustion flue gas which may contain as little as 6 to 10% $CO_2$, i.e. energy is consumed in compressing 90% or more of the feed gas that is eventually discarded as waste.

Typical prior art processes for $CO_2$ recovery have relied on adsorbents such as zeolite 13X or BPL activated carbon. For recovery of $CO_2$ from low concentration sources such as flue gas, the advantage of using a relatively strong adsorbent such as zeolite 13X is that it retains a significant capacity for $CO_2$, even at the low $CO_2$ partial pressures present in the feed. The disadvantage is that it requires very low pressure for regeneration. BPL activated carbon is a much weaker adsorbent for $CO_2$, and consequently, does not require such demanding desorption conditions. However, the utility of this adsorbent is diminished for low concentration sources like flue gas because of the weak and nonspecific interaction with $CO_2$. At flue gas feed conditions, the equilibrium loadings of $N_2$ and $CO_2$ on BPL carbon are nearly identical, resulting in low adsorption selectivity. This low efficiency of separation severely limits the purity and recovery that can be achieved in the process.

It is among the objects of the present invention to provide improved PSA processes and apparatus for the recovery of heavy components such as $CO_2$ from multi-component gas mixtures at predetermined substantially constant product purity, i.e. a variation of less than plus or minus 10 percent of the desired product purity, utilizing adsorption techniques employing low adsorption pressures and with no bed-to-bed interactions.

A further object of the invention is to provide such processes and apparatus, requiring lower capital and operating costs than for prior art techniques, particularly for small scale applications.

Yet an additional object of the invention is to provide improved PSA processes for the recovery of $CO_2$ from multi-component gas mixtures, by utilizing as adsorbents therein zeolites having particular adiabatic separation factor and dynamic $CO_2$ loading characteristics.

With these and other objects in mind, the invention is hereinafter described in detail, the novel features thereof being particularly pointed out in the appended claims.

SUMMARY OF THE INVENTION

In accordance with the present invention, a pressure swing adsorption (PSA) process for the recovery of a heavy gas component, e.g., $CO_2$, from a multi-component gas mixture is provided, which comprises:

(1) feeding the multi-component gas mixture into an inlet of and through at least one adsorber maintained under desired operating conditions (i.e., at predetermined adsorption temperatures and pressures), adsorbing the heavy component of the gas mixture on an adsorbent within the adsorber and removing an effluent enriched with the light component or components of the mixture from the adsorber outlet, at least a portion of the light component-enriched effluent being retained in a pressure zone communicating with the adsorber outlet;

(2) blowing down a portion of the light component-enriched effluent cocurrently through the adsorber outlet into a vacuum zone maintained at a pressure less than the adsorption pressure and communicating with the adsorber and at the same time, removing desorbed gas by countercurrent evacuation from the adsorber through the adsorber inlet, the total action resulting in the simultaneous depressurization of the adsorber cocurrently from its outlet and countercurrently from its inlet which results in removal of void space gas from the adsorber inlet without substantially increasing the concentration of heavy component product in the countercurrent evacuation stream;

(3) terminating the flow of the blowdown gas through the adsorber outlet while continuing the flow of the countercurrent evacuation stream from the adsorber inlet to depressurize the adsorber until the pressure in the adsorber is less than that in the vacuum zone and continue desorption of the heavy gas component until it reaches a predetermined concentration in the countercurrent evacuation stream;

(4) passing the blowdown gas from the vacuum zone to the bed outlet as a purge gas stream countercurrently through the adsorber and, at the same time, continuing the countercurrent effluent flow from the adsorber inlet to make and recover a product stream enriched in the heavy gas component, such heavy gas component produced at a predetermined constant purity by controlling flow of purge stream so that pressure and purity of the product effluent remain constant initially, followed by a falling pressure step induced to maintain constant purity in the product stream;

(5) optionally, if all of the blowdown gas from the vacuum zone is not used as a purge gas in step (4), terminating flow from the inlet of the adsorber and passing the residual blowdown gas into the outlet of the adsorber to equalize the pressure in the vacuum zone and the adsorber and partially repressurize the adsorber;

(6) passing a portion of the light component-enriched effluent from the pressure zone into the outlet of the adsorber to partially repressurize the adsorber;

(7) passing an additional portion of the multi-component feed gas mixture into the inlet of the adsorber to repressurize the adsorber to its adsorption pressure; and (8) repeating the foregoing steps to produce the heavy component-containing product stream in constant purity.

Preferably, the PSA process and apparatus of this invention provide an economical system for heavy component recovery such as $CO_2$ recovery from gas streams containing up to about 60% $CO_2$, e.g., combustion flue gas, lime kiln off-gas or hydrogen plant tail-gas, incorporating more weakly adsorbed, light components such as nitrogen, oxygen, hydrogen, methane and/or carbon monoxide. When so utilized, the process is desirably carried out at about atmospheric pressure, i.e., at less than 2 and, preferably at about 1–1.5 atmospheres. Other applications include nitrogen recovery from air, heavy hydrocarbon recovery from natural gas, and oxygen recovery from air.

As indicated above, potential feed sources such as flue gas may contain as little as 6 to 10% $CO_2$. Consequently, adsorption at elevated pressure requires the compression of large amounts of light component. If the light component in the feed stream is not a valuable product, compression should be minimized to conserve energy.

The process of this invention requires only minimal feed compression to overcome pressure drop in the apparatus. Moreover, as indicated below, the adsorbent utilized is chosen to maximize dynamic capacity and selectivity for the heavy component at the feed concentration and at near-ambient adsorption pressures. Finally, in those cycles described below in which partial cocurrent displacement by the heavy component-enriched product stream is utilized to increase heavy component recovery and provide continuous production, the quantity of displacement gas is minimized, thus further reducing power consumption. Reduced power consumption eliminates the need for the equalization techniques employed in a number of prior art systems to recover compression energy.

In the present invention, the further use of simultaneous cocurrent/countercurrent depressurization of the adsorber by exhausting the light component-enriched effluent as a blowdown gas out of the adsorber and into an external vacuum zone while at the same time removing an evacuation stream from the adsorber inlet (step (2)) rejects void gas from the heavy component product. At the beginning of the depressurization step in a conventional cycle, the concentration of heavy component in the void spaces at the inlet end of the bed is identical to the feed concentration. As the pressure is reduced the heavy component concentration in the gas phase at the inlet of the bed begins to increase from this initial value. During the initial period of depressurization the exiting gas is enriched in heavy component but is not of product quality. To overcome this problem, it has previously been necessary to rinse the adsorbent bed with heavy component product after completion of the adsorption step in order to displace the low quality gas from the bed, and to thereafter recover pressure energy from such operation by using the displaced effluent to repressurize another adsorber. In the present invention the problem is minimized by blowdown protocol which controls pressure and flow in the adsorber to minimize mixing losses or by using partial cocurrent rinsing with heavy component product to raise the initial purity before depressurization begins. This latter step allows product to be recovered immediately upon blowdown, eliminating the need for rejecting waste from the inlet end of the bed.

Significantly, by thereafter returning the blowdown gas from the vacuum zone countercurrently through the adsorber as a purge stream while continuing to remove the evacuation stream from the adsorber (step (4)), a controlled purge is established in the present invention which not only serves to move the heavy component product toward the adsorber inlet but, moreover, may be utilized to effect controlled reduction in pressure in the adsorber bed during purging to maintain constant purity in the product stream. Fluctuations in heavy component purity that typically occur during depressurization are thereby eliminated, removing the need for a large surge vessel to smooth out such fluctuations.

In accordance with a further, preferred form of the invention, at least a portion of the product stream recovered in step (4) above is recycled to the inlet of the adsorber to affect cocurrent displacement of the gas mixture at the inlet and thereby increase the inlet concentration of the heavy component, e.g., $CO_2$ to the desired purity of the product stream. The minimum quantity of displacement gas required is dictated by feed and product purity, this minimum quantity of displacement gas is provided to insure compliance with predetermined product purity requirements and also to minimize the consequent power consumption associated therewith.

Many prior art processes utilize adsorber bed-to-bed interactions for equalization or purging purposes, which typically require three or more identical adsorbers for efficient cycle operation. As a result, capital costs for multiple adsorbers and associated valving are significant for these processes. The present invention reduces the number of adsorbers and switching valves required by eliminating bed-to-bed interactions. Pressure and vacuum tanks provide repressurization and purge gas, and low pressure adsorption eliminates the necessity for equalization to recover pressure energy. The process of the present invention can thus be implemented with a single adsorber or, preferably, with two independently but sequentially operable adsorbers to permit continuous utilization of vacuum equipment.

Consequently, in accordance with the apparatus aspect of the present invention, a PSA apparatus for recovery of a heavy gas component from a feed gas supply of a multi-component gas mixture, is provided, which comprises:

(1) an adsorber having an inlet end and an outlet end and incorporating a layer of an adsorbent capable of selectively adsorbing the heavy component of the gas mixture relative to the light component or components thereof;

(2) means for overcoming pressure drop through the adsorber to establish flow of gas through the adsorber;

(3) a pressure tank communicating with the outlet end of the adsorber for receiving a light component-enriched effluent from the adsorber and for feeding the light component-enriched effluent into the outlet end;

(4) a vacuum tank communicating with the outlet end of the adsorber for receiving a further portion of the light component-enriched effluent from the adsorber and for feeding the light component-enriched effluent as a blowdown gas into the adsorber through its outlet end;

(5) outlet valve means for selectively placing the pressure and vacuum tanks in communication with the outlet end of the adsorber for depressurizing and repressurizing the adsorber;

(6) means for withdrawing desorption effluent from the adsorber;

(7) inlet valve means for selectively placing the feed gas supply and the desorption effluent withdrawal means in communication with the inlet end of the adsorber to facilitate feed of the gas mixture into and removal of the product stream from the inlet end of the adsorber; and (8) control means for concurrently actuating the outlet valve means and the inlet valve means to facilitate feed of the light component-enriched effluent as a blowdown gas from the vacuum tank into the adsorber and removal of an evacuation stream and the product stream from the adsorber, to simultaneously depressurize the adsorber cocurrently from its outlet end and countercurrently from its inlet end.

As indicated above, the apparatus of the invention may utilize a single adsorber with pressure and vacuum tanks communicating with the outlet end thereof to facilitate repressurization and purging of the adsorber, and a desorption effluent withdrawal means, e.g. a vacuum pump, communicating with the adsorber inlet for removing the heavy component-enriched evacuation and product streams. The use of such apparatus eliminates the necessity to provide large, expensive surge tanks to dampen fluctuations in product purity, product pressure or product flow rate and thereby reduces capital cost and energy expense in carrying out PSA techniques therewith. While such apparatus of the invention eliminates the need for plural adsorbers and relatively complex switching means for effecting bed-to-bed interactions therebetween it is preferred, in accordance with the invention, to employ a pair of independently operable adsorbers which are operated in staged sequence to provide a continuous flow of the product stream from the inlet end of the adsorber. Alternatively but less preferably, portions of the feed stream may be simultaneously fed through the adsorbers and they may operate in parallel. In either event, operation with two adsorbers allows more efficient utilization of any rotating equipment (compressor and vacuum pump) and hence, increased capacity and efficiency.

In accordance with a further feature of the present invention, an improved method for selectively recovering $CO_2$ from multi-component gas mixtures is provided, comprising adsorbing the $CO_2$ at substantially atmospheric pressure in particular adsorbents. That method comprises adsorbing the gas mixture in an adsorbent at feed conditions of about 250 to 450 K, more preferred 300 to 400 K, and pressures of about 90 to 200 kPa, depressurizing the adsorbent bed to sub-atmospheric pressure to desorb the $CO_2$ from the bed, and recovering a $CO_2$-containing product stream from the bed at substantially constant purity, wherein the adsorbent has an adiabatic separation factor $\Delta CO_2/\Delta N_2$ in excess of about 1, preferably above 2, and a dynamic $DCO_2$ loading of at least 0.1 mol/kg at the process operating conditions.

Tailoring of the adsorbent to these process conditions provides additional capital cost reduction through improved efficiency of the adsorbent. Adsorbents that provide high working capacity and selectivity in the preferred low pressure range of operation are critical to reducing the quantity of adsorbent needed for a given production rate. Zeolite NaY and zeolite NaX (2.0) are exemplary adsorbents for $CO_2$ that provide reduced bed size factors for production of $CO_2$ from combustion flue gas, lime kiln off-gas, hydrogen plant tail gas and other sources containing more weakly adsorbed components such as nitrogen, oxygen, hydrogen, methane, and carbon monoxide. Further reduction in adsorbent inventory is achieved by operating with shallow adsorption beds and short cycle times. This increases productivity of the adsorbent and also works to minimize the size of surge volumes if needed to dampen flow rate variations.

BRIEF DESCRIPTION OF THE DRAWINGS

The invention is hereinafter described in detail with reference to the accompanying drawings in which.

DETAILED DESCRIPTION OF THE INVENTION

As indicated above, the present invention is directed to the recovery of the more strongly adsorbed gas component in a multi-component gas mixture, by separating such component from more weakly adsorbed components admixed therewith. For convenience, the more strongly adsorbed gas component is identified herein as the "heavy" component, and the more weakly adsorbed components are described as the "light" components of the gas mixture. Further, in the following description, principal reference is made to the recovery of $CO_2$ as the heavy component of gas mixtures such as combustion flue gas, lime kiln off-gas and/or hydrogen plant tail-gas, containing nitrogen, oxygen, hydrogen, methane, carbon monoxide and/or other light components therein. It will, however, be understood that while the invention is primarily directed to the recovery of $CO_2$ from such multi-component gas mixtures, it is not limited to the recovery of $CO_2$ or to separations from any particular feed-gas source. Thus, it is intended that the processes and apparatus of the invention may be used for any multi-component separation in which the more selectively adsorbed component is a desired product. This includes, but is not limited to, nitrogen recovery from air using nitrogen-selective adsorbents, oxygen recovery from air using oxygen-selective adsorbents, carbon monoxide recovery from syngas using CO-selective adsorbents, and oxygen/argon separation using either oxygen-selective or argon-selective adsorbents. One skilled in the art will appreciate that the process conditions are tailored to the specific separation of interest.

Single-Bed Systems (FIGS. 1–4)

Figure 1:
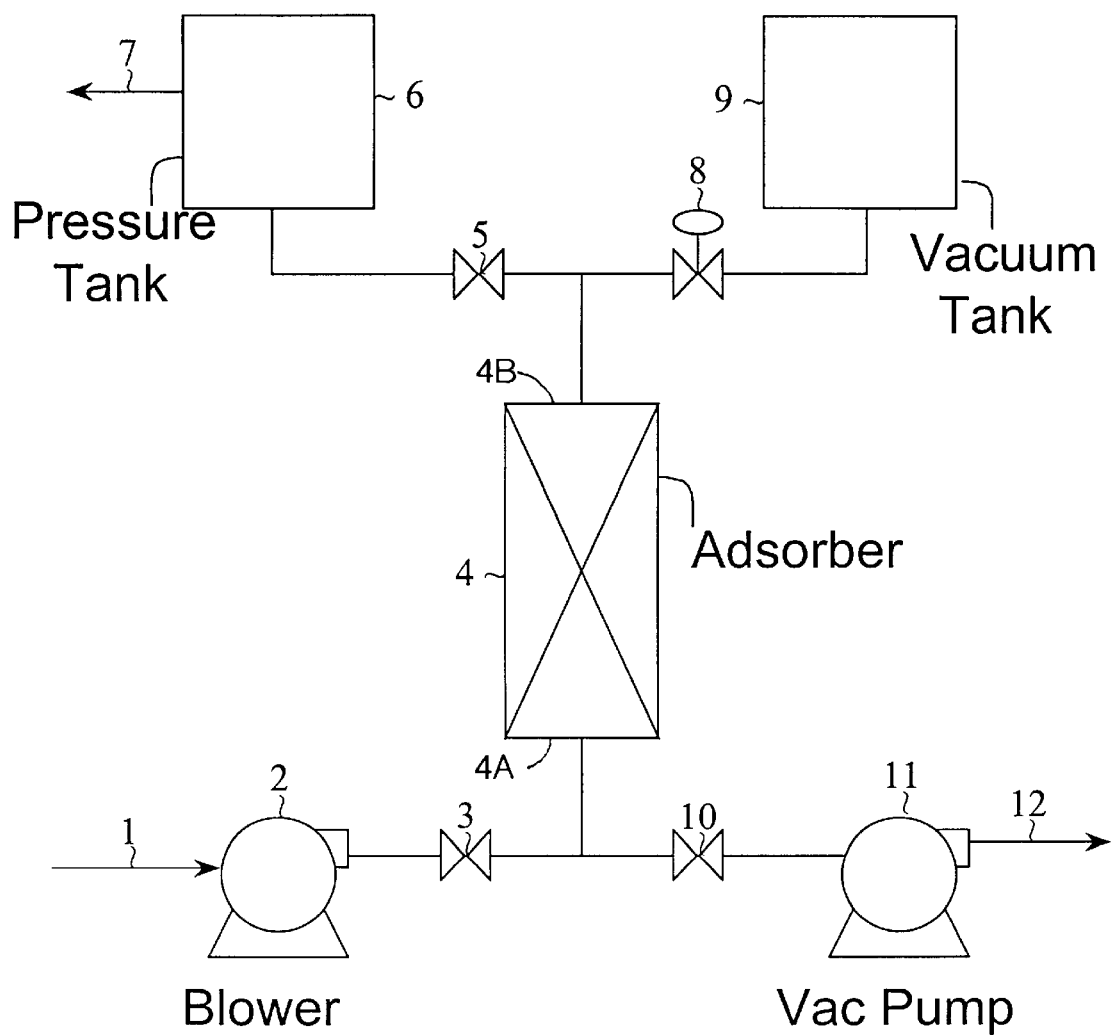
FIG. 1 is a flow diagram of a particular embodiment of a single-bed PSA apparatus of the present invention.

The essential elements of the basic apparatus of the invention are illustrated in FIG. 1. In the most basic embodiment shown therein, a single adsorber 4 is utilized incorporating a bed or beds of an appropriate adsorbent or adsorbents, and having an inlet end 4A and an outlet end 4B. The inlet end 4A of the adsorber is connected through a two-way valve 3 to a feed blower 2 for supplying a multi-component gas mixture from a feed line 1 to the adsorber, and through a two-way valve 10 to a vacuum pump 11 for evacuating the adsorber to pressures below ambient and for recovering a product stream through line 12. Preferably, feed blower 2 compresses the feed gas only to such an extent as to overcome pressure drop through the system, thereby providing the gaseous feed at a pressure slightly above ambient, atmospheric pressure. The feed blower may be eliminated when the feed gas is supplied at sufficient pressure to overcome system ΔP.

The outlet end 4B of the adsorber is connected through a two-way valve 5 to a pressure tank 6, from which effluent may be removed for recovery as a further product stream, or vented, through line 7, or through a control valve 8 to a vacuum tank 9. The pressure tank 6 is used to store gas at ambient pressure or above; the vacuum tank 9 is used to store gas at pressures below ambient. The pressure tank is preferably a variable volume vessel operating at approximately ambient pressure.

In operation, feed gas is provided to the inlet end 4A of the adsorber 4, light component effluent from the outlet end 4B of the adsorber is collected in the pressure tank 6 and subsequently reused as repressurization gas, cocurrent blowdown gas from the outlet end 4B of the adsorber is collected in the vacuum tank 9 and subsequently reused as purge, and heavy component-enriched product is recovered through line 12 from the discharge side of vacuum pump 11. A portion, or all, of the light component effluent is collected in the pressure tank 6. Some of the light component may be exhausted as waste through line 7 without being returned to the system. Two-way switching valves 3, 10 and 5 allow the adsorber 4 to communicate alternately with the blower 2, vacuum pump 11 and pressure tank 6, respectively. A control valve 8 is used to regulate flow between the adsorber and the vacuum tank 9.

Figure 2:
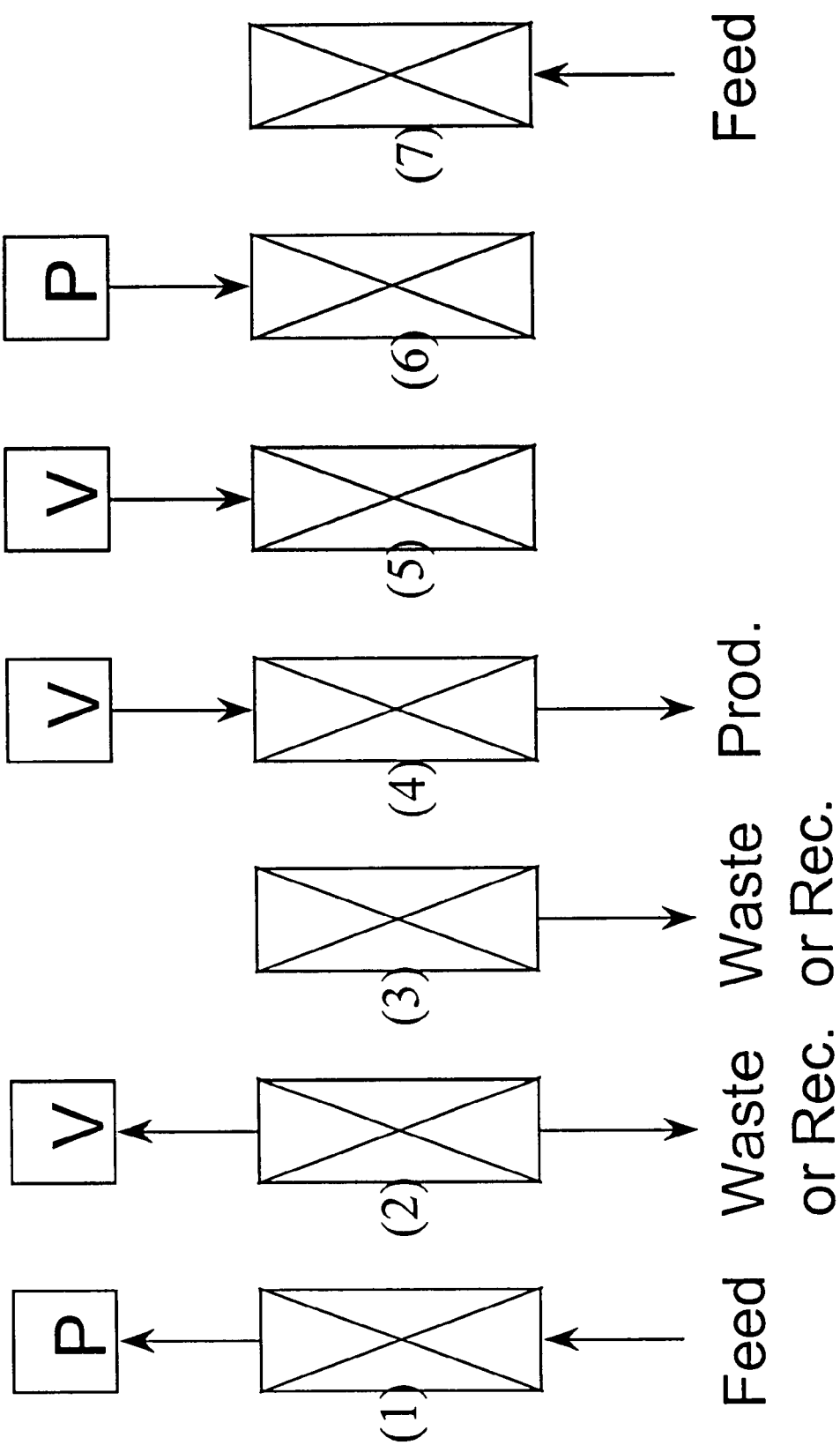
FIG. 2 illustrates the basic cycle sequence of the PSA process of the invention utilizing the single-bed apparatus of FIG. 1.

The single-bed system shown in FIG. 1 is suitable for use in the practice of the basic cycle steps shown in FIG. 2.

During step (1) illustrated in FIG. 2, feed gas is passed through line 1 to the inlet side of the feed blower 2. The two-way valve 3 is opened to allow flow from the outlet of blower 2 into the inlet end 4A of the adsorber 4. Effluent from the outlet end 4B of adsorber 4 passes through two-way valve 5 into pressure tank 6. At least a portion of the effluent from the adsorber is stored in pressure tank 6, the fraction of effluent to be removed from the system exiting via line 7.

The multi-component feed gas is thus fed at the adsorption pressure to the inlet of the adsorber, the heavy component being selectively retained by the adsorbent and the gas phase being enriched in the light component or components; at least a portion of the light component effluent from the outlet end of the adsorber is collected and retained in the pressure tank during this step.

Step (2), simultaneous cocurrent and countercurrent depressurization, is then carried out by closing valve 3 and valve 5, opening control valve 8 to allow flow into vacuum tank 9, and opening the two-way valve 10 to allow flow to vacuum pump 11. During this step, discharge from vacuum pump 11 is recovered in line 12 and may initially be rejected as waste or recycled with the feed. In step (2), the adsorber is thus simultaneously depressurized cocurrently from its outlet end, and countercurrently from its inlet end; the bed pressure provides the driving force for cocurrent depressurization to the vacuum tank, and the bed pressure and vacuum pump provide the driving force for countercurrent depressurization. The cocurrent depressurization gas is collected in the vacuum tank at below ambient pressure for subsequent use as purge gas; the countercurrent depressurization gas in this step consists primarily of void space gas at feed composition from the adsorber inlet and may initially be rejected or recycled with the feed. Enrichment of the heavy component in the countercurrent depressurization gas is minimized in this step by careful balance of the countercurrent and cocurrent blowdown flows.

Continued countercurrent evacuation, step (3), is affected by closing control valve 8 while keeping valve 10 open. The flow is thus terminated from the vacuum tank to the outlet end of the adsorber bed while continuing the countercurrent evacuation with the vacuum pump until the purity of the heavy component product meets minimum product purity requirements and the pressure in the adsorber bed is lower than the pressure in the vacuum tank; this countercurrent evacuation gas is enriched in the heavy component and may be rejected as waste or recycled with the feed.

At the beginning of the product make-step, step (4), the pressure in adsorber 4 will be lower than in vacuum tank 9. Control valve 8 is opened and used to control the purge stream flowing from vacuum tank 9 into adsorber 4. Valve 10 remains open to allow product to be recovered through vacuum pump 11 into line 12. The heavy component product is thus removed from the inlet end of the adsorber while low pressure purge gas is passed from the vacuum tank to the outlet end of the adsorber. The purge rate is controlled by the control valve so that pressure and product purity remain constant initially. As product purity begins to decrease, the purge rate is decreased as the pressure in the adsorber falls while maintaining constant product purity. Following this constant purity product make-step, the bed is repressurized to the adsorption pressure.

If sufficient gas remains in vacuum tank 9, it may be used to partially repressurize the bed in step (5). During this step valve 10 is closed and control valve 8 is fully opened to equalize the pressure in vacuum tank 9 and adsorber vessel 4. Ideally, the exact quantity of gas stored in step (2) is used as purge in step (4) and this equalization step (5) may be eliminated. If necessary, step (5) would thus partially repressurize the adsorber countercurrently from its outlet end, using the remaining cocurrent depressurization gas from the vacuum tank. Note that the end of step 4 and step 5, if required, serve to restore the vacuum tank to the low pressure required in subsequent steps.

In step (6), partial repressurization with light component effluent is accomplished by opening valve 5 while control valve 8 and valve 10 are closed. Light component effluent that was stored in pressure tank 6 during step (1) repressurizes adsorber 4. Partial countercurrent repressurization is thus effected at the outlet end 4B of the adsorber with light component from the pressure tank.

The final step in the cycle, step (7), is repressurization to the adsorption pressure. Valve 5 is closed and valve 3 is opened to allow feed gas to enter adsorber 4. The adsorber is thus repressurized to the adsorption pressure in the cocurrent direction using feed gas passed to the adsorber inlet 4A. At the end of repressurization the cycle sequence is complete, and a subsequent cycle may then begin with step (1).

Figure 3:
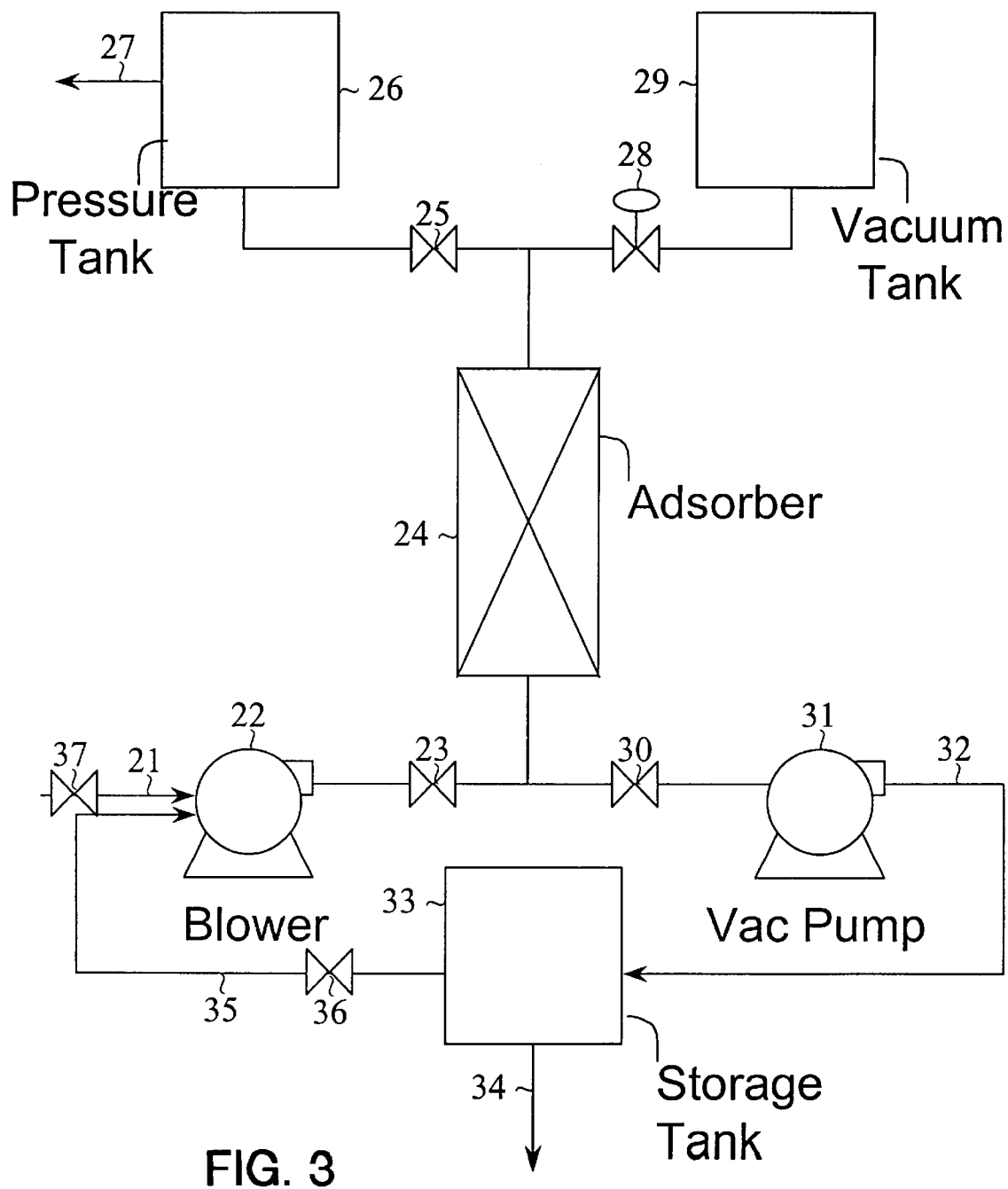
FIG. 3 is a schematic flow diagram of a further embodiment of a single-bed PSA apparatus of the invention, incorporating a cocurrent displacement system for feeding a heavy component product to the inlet of the adsorber during a portion of the processing cycle.

An alternative embodiment of the invention employs cocurrent displacement with heavy component product during a portion of the process cycle. This requires an additional tank for collecting a portion of the heavy component product for subsequent feed to the adsorber. The essential elements of the apparatus for cocurrent displacement are illustrated in FIG. 3. Elements 21–32 of the VPSA system shown therein correspond to the like elements 1–12 of the embodiment of the invention illustrated in FIG. 1. In addition, in order to provide partial cocurrent rinsing with the product stream recovered from adsorber 24, a heavy component storage tank 33 is provided which is connected to the discharge side of vacuum pump 31, and is provided with a discharge line 34 and a recycle line 35 connected to the inlet side of blower 22. Valve 36 is a two-way valve that is opened during cocurrent displacement to allow displacement gas to be passed to the inlet side of blower 22. Valve 37 is a two-way valve used to stop flow of feed gas during the cocurrent displacement step. The cocurrent displacement gas may be passed directly to the inlet of adsorber 24 without passing through blower 22 if the discharge pressure of the vacuum pump is high enough to overcome the pressure drop in the system.

A portion of the heavy component product recovered from the discharge side of the vacuum pump may thus be temporarily stored in the heavy component storage tank, and thereafter fed to the suction side of the feed blower during a later step in the cycle. This heavy component storage tank operates at approximately ambient pressure and may be a variable volume vessel. Only a portion of the heavy component product is recycled back to the adsorber; the remaining fraction is removed from the system as product.

Figure 4:
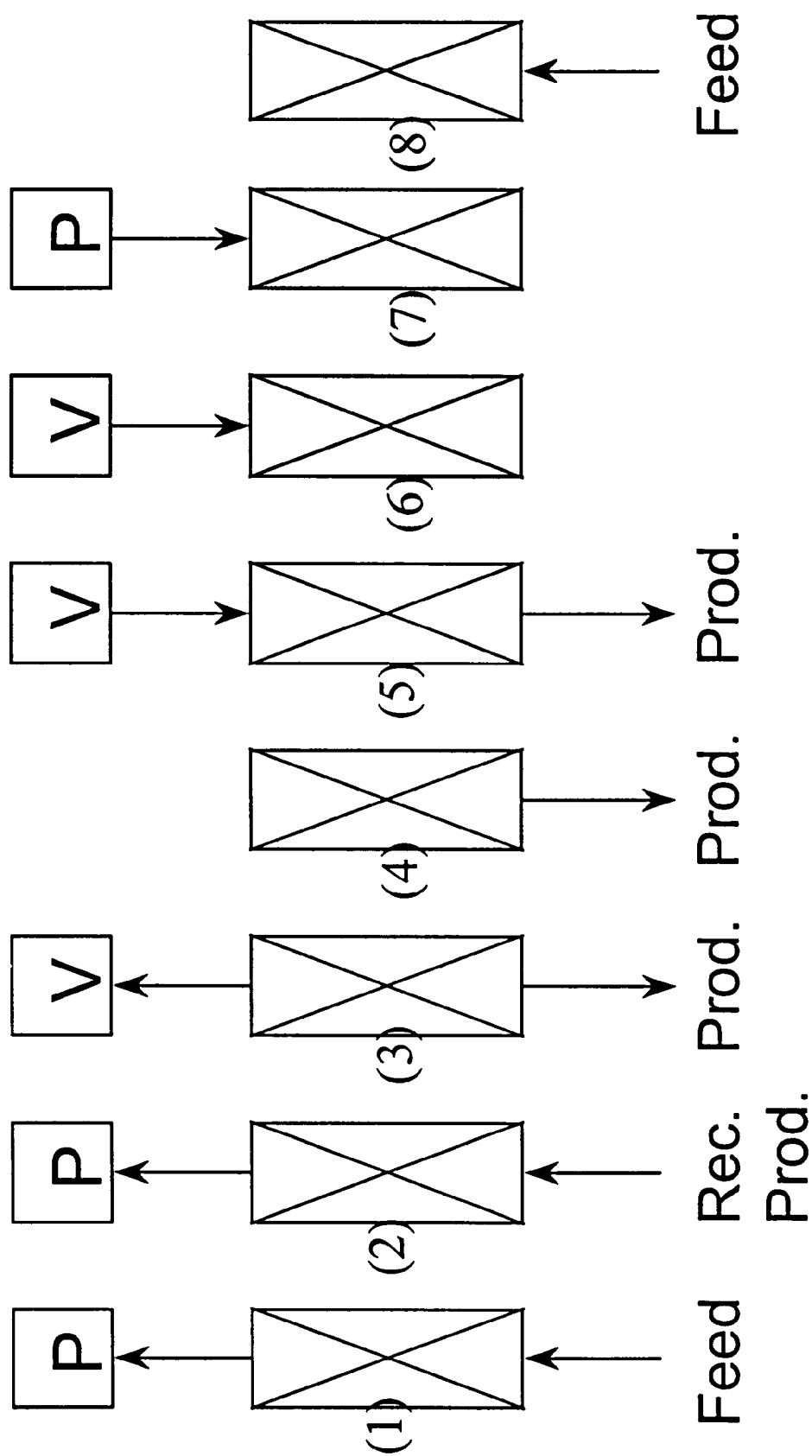
FIG. 4 illustrates the cycle sequence for the single-bed cocurrent displacement system apparatus of FIG. 3.

The single-bed system shown in FIG. 3 is suitable for use in the cocurrent displacement cycle shown in FIG. 4. During the first step, step (1), feed gas 21 is passed through valve 37 to the inlet side of feed blower 22. The two-way valve 23 is opened to allow flow from the outlet of blower 22 into the inlet end of adsorber 24. Effluent from the outlet end of adsorber 24 passes through two-way valve 25 into pressure tank 26. At least a portion of the effluent from the adsorber is stored in pressure tank 26, the fraction of effluent to be removed from the system exiting via line 27. The multi-component feed gas is thus passed at the adsorption pressure to the adsorber inlet, during which the heavy component is selectively adsorbed by the adsorbent material and the gas phase is enriched in the lighter component or components; at least a portion of the light component effluent from the outlet end of the adsorber is collected and retained in the pressure tank during this step.

Partial cocurrent rinsing with heavy component, step (2), is accomplished by passing product from the heavy component storage tank 33 through line 35 and valve 36 to the inlet side of blower 22. Valves 23 and 25 remain open. Valve 37 is closed. A portion or all of the effluent from adsorber 24 is stored in pressure tank 26, the fraction of effluent to be removed from the system exiting via line 27. The heavy component product is thus passed from the heavy component storage tank to the inlet of the adsorber; this displaces a portion of the nonadsorbed gas containing a large fraction of light component from the inlet end of the adsorber, increasing the gas phase concentration of heavy component at the inlet end, to the minimum desired product purity. The amount of displacement gas is chosen so that the concentration of heavy component recovered from the inlet end of the bed during subsequent depressurization does not drop below the minimum product purity requirements. A portion or all of the effluent from the outlet end of the adsorber may be stored in the pressure tank during this step.

Simultaneous cocurrent and countercurrent depressurizations, step (3), are then conducted by closing valves 23 and 25, while opening control valve 28 to allow flow into vacuum tank 29, and opening two-way valve 30 to allow flow to vacuum pump 31. During this step, discharge from vacuum pump 31 is passed through line 32 into the heavy component storage tank 33. The portion of product not retained for subsequent cocurrent displacement is removed from the system through line 34. In this step the adsorber is simultaneously depressurized cocurrently from its outlet end and countercurrently from its inlet end, the bed pressure providing the driving force for cocurrent depressurization to the vacuum tank, and the bed pressure and vacuum pump providing the driving force for countercurrent depressurization. The cocurrent depressurization gas is collected in the vacuum tank at sub-ambient pressure for subsequent use as purge gas; the countercurrent depressurization gas is recovered as heavy component product.

Continued countercurrent evacuation, step (4), is accomplished by closing control valve 28 while keeping valve 30 open. Control valve 28 remains closed until the pressure in the adsorber bed reaches a predetermined level that is lower than the pressure in the vacuum tank; this countercurrent evacuation gas is recovered as heavy component product.

At the beginning of step (5), the pressure in adsorber 24 will be lower than in vacuum tank 29. Control valve 28 is opened and used to control flow from vacuum tank 29 into the adsorber. Valve 30 remains open to allow product to be recovered through vacuum pump 31 into line 32. In this step the heavy component product from the inlet end of the adsorber is recovered while passing low pressure purge gas from the vacuum tank to the outlet end of the adsorber 24. The purge rate is controlled by the control valve so that both pressure and product purity remain constant initially; as product purity begins to decrease, the purge rate is decreased to allow pressure in the adsorber to fall in order to restore and maintain constant product purity.

Following the constant-purity product make-step (5), the bed may be partially repressurized in step (6). If all of the cocurrent depressurization gas that was stored in vacuum tank 29 during step (3) is not used as purge gas during step (5), it may be used to partially repressurize the bed in step (6). During step (6), valve 30 is closed and control valve 28 is fully opened to equalize the pressure in vacuum tank 29 and adsorber 24. Ideally, however, the exact quantity of gas stored in step (3) is used as purge in step (5) and the equalization step (6) may be eliminated.

In step (7), partial repressurization with light component effluent is accomplished by opening valve 25 while control valve 28 and valve 30 are closed. Light component effluent that was stored in pressure tank 26 during step (1) repressurizes adsorber 24.

The final step in the cycle, step (8), is repressurization to the adsorption pressure. Valve 25 is closed and valve 23 is opened to allow feed gas to enter the adsorber 24. The adsorber is thus repressurized to its operating pressure in a cocurrent direction using feed gas passed from the feed compressor to the adsorber inlet.

At the end of repressurization the cycle sequence is complete, and a subsequent cycle may then begin with step (1).

Figure 5:
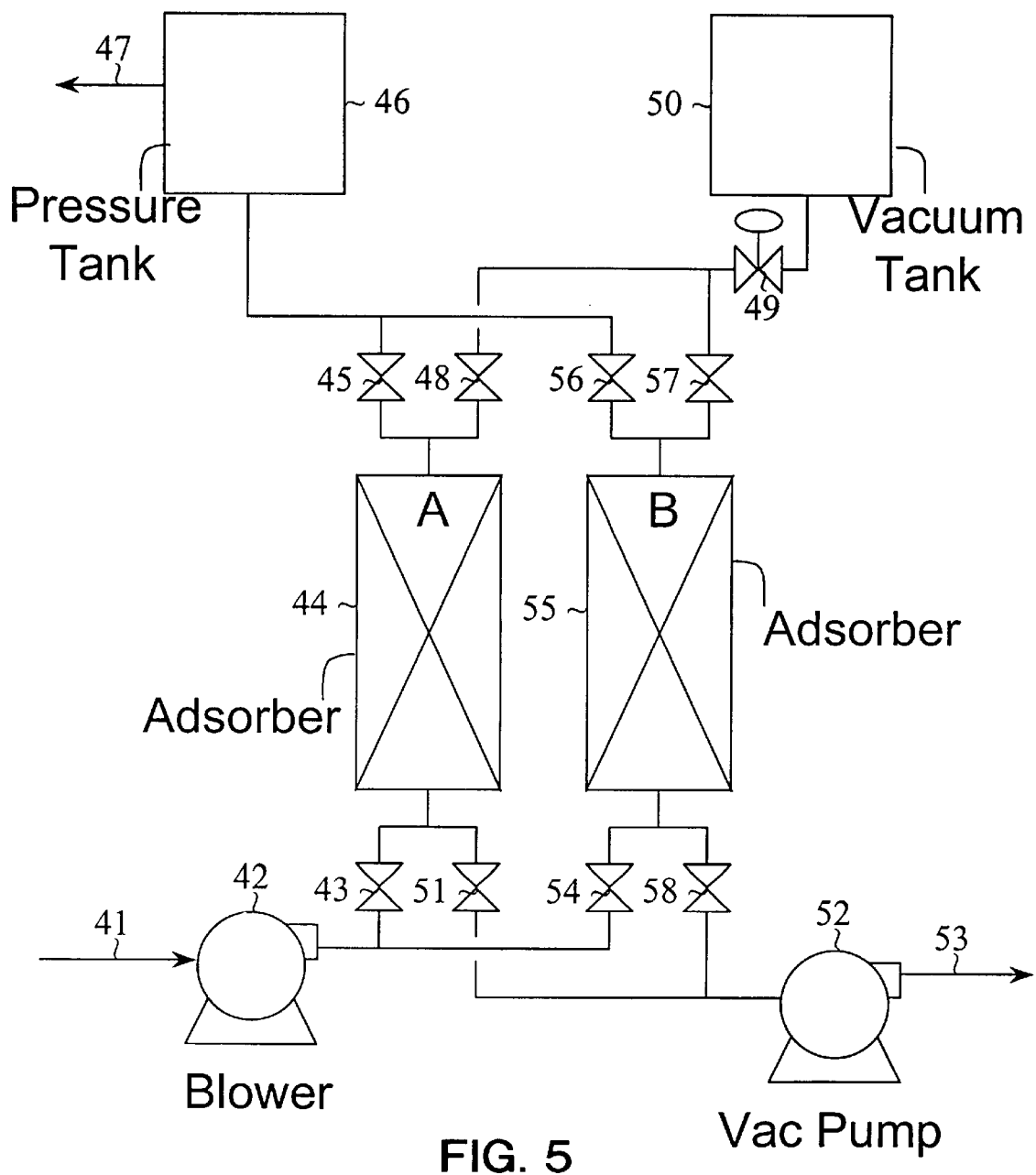
FIG. 5 is a schematic flow diagram of a further embodiment of a two-bed PSA apparatus of the invention.
Figure 6:
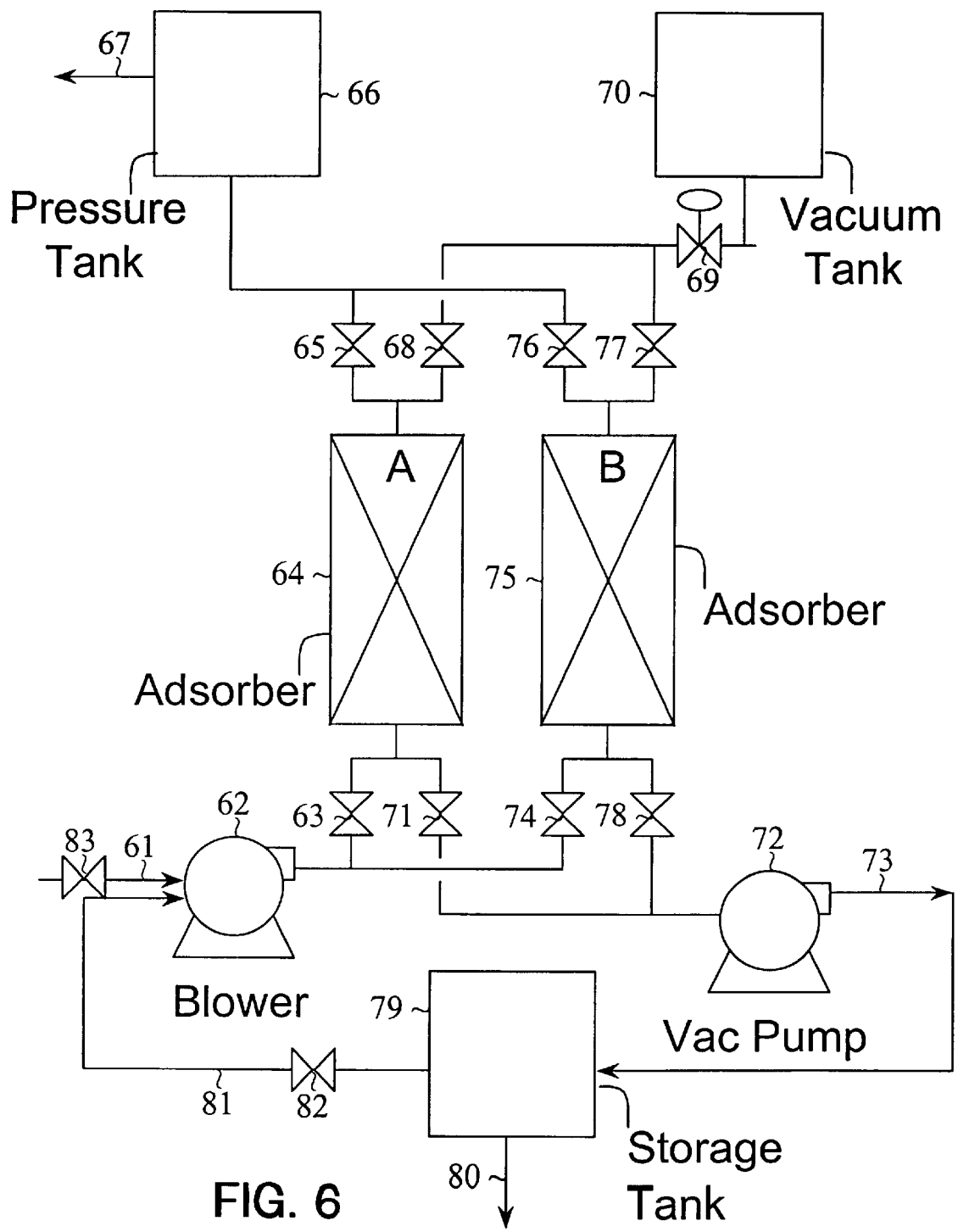
FIG. 6 is a schematic flow diagram of a preferred embodiment of a two-bed/cocurrent displacement apparatus of the invention.

Two-Bed Systems (FIGS. 5 and 6)

Preferred embodiments of the PSA systems of the invention utilize two identical, independently operable adsorbers through which the multi-component gas mixture is sequentially fed and in which the adsorption/desorption operations are carried out in staged sequence such that the product streams recovered from the individual adsorbers are combined to provide a continuous flow of the product stream containing the heavy gas component at the desired purity. Each adsorber interacts alternately with the pressure tank, vacuum tank, feed compressor and vacuum pump. There are no direct adsorber-to-adsorber interactions during the cycle.

The essential elements of the basic two-bed apparatus are shown in FIG. 5. Elements 41–48 and 50–53 are the elements of a first adsorber train A, corresponding to elements 1–12 of the single-bed apparatus of FIG. 1, and elements 54–58 represent a second adsorber train B cycled with adsorber train A (thus elements 54–58 correspond to elements 43–45, 48 and 51, respectively). Control valve 49 is incorporated in the system to control blowdown and purge flows between vacuum tank 50 and the respective adsorber trains A and B.

The process cycle steps for each bed in the basic two-bed apparatus of FIG. 5 are identical to those for the single adsorber in FIGS. 1 and 2. The cycle for the first adsorber is operated out of phase with respect to the second adsorber as indicated in Table I below:

TABLE I

Two-Bed Basic Cycle

| Time | Bed A | Bed B |
|---|---|---|
| 0 | | |
| | 5) V Repress. | 2) Blowdown |
| | 6) P Repress. | 3) Evacuation |
| | 7) Feed Repress. | 4) Product/Purge |
| | 1) Adsorption | |
| t½ cycle | | |
| | 2) Blowdown | 5) V Repress. |
| | 3) Evacuation | 6) P Repress. |
| | | 7) Feed Repress. |
| | 4) Product/Purge | 1) Adsorption |
| t$_{cycle}$ | | |

Preferably, the cycle steps are balanced such that adsorber train A goes through steps (5), (6), (7) and (1) while adsorber train B is cycled through steps (2), (3) and (4). This provides balanced cycle operation which eliminates idle time for the adsorbers, allows more efficient utilization of the rotating equipment, and provides increased capacity. If the optional equalization step (5) is unnecessary the cycle can be balanced so that the vacuum pump is in continuous operation. Otherwise, an idle period equal to the time required for step (5) is necessary to prevent simultaneous interaction between both adsorbers and the vacuum surge tank.

The most preferred embodiment of the invention, illustrated in FIG. 6, employs two adsorbers and cocurrent rinsing with the heavy component product. Each adsorber undergoes the same cyclic operation as for the single adsorber in FIGS. 3 and 4. Each adsorber interacts alternately with the pressure tank, vacuum tank, feed compressor and vacuum pump. Again, there are no direct adsorber-to-adsorber interactions during the cycle. Two-adsorber operation with cocurrent rinsing allows continuous production of heavy component product, as well as more efficient utilization of the rotating equipment, resulting in the best process efficiency and highest production capacity.

The essential elements of the cocurrent displacement, two-adsorber bed apparatus are shown in FIG. 6. The elements 61–78 correspond to elements 41–58 of the two-bed basic apparatus illustrated in FIG. 5. An additional heavy component storage tank 79 receiving discharge from vacuum pump 72 through line 73 and provided with removal line 80 and recycle line 81 communicating with the inlet side of blower 62 is additionally provided for cocurrent displacement (rinsing). Elements 72, 73 and 79–83 correspond, respectively, to elements 31–37 of the single-bed cocurrent displacement apparatus shown in FIG. 3, and operate in the same manner as described in connection therewith.

The process cycle steps for each bed in the cocurrent displacement, two-bed apparatus of FIG. 6 are identical to those for the single adsorber in FIGS. 3 and 4. The cycle for one vessel is operated out of phase with respect to the other vessel as indicated in Table II below.

TABLE II

Two-Bed Cocurrent Displacement Cycle

| Time | Bed A | Bed B |
|---|---|---|
| 0 | | |
| | 6) V Repress. | 3) Blowdown |
| | 7) P Repress. | 4) Evacuation |
| | 8) Feed Repress. | 5) Product/Purge |
| | 1) Adsorption | |
| | 2) Cocurrent Disp. | |
| t½ cycle | | |
| | 3) Blowdown | 6) V Repress. |
| | 4) Evacuation | 7) P Repress. |
| | | 8) Feed Repress. |
| | 5) Product/Purge | 1) Adsorption |
| | | 2) Cocurrent Disp. |
| t$_{cycle}$ | | |

Preferably, the cycle steps are balanced so that adsorber train A goes through steps (6), (7) and (8), (1) and (2) while adsorber train B executes steps (3), (4) and (5). This provides balanced cycle operation which eliminates idle time for the adsorbers, allows more efficient utilization of the rotating equipment, provides increased capacity, and provides continuous production of heavy component product. If optional step (6) is eliminated the cycle can be balanced so that the vacuum pump is in continuous operation. Otherwise, an idle period equal to the time required for step (6) is necessary to prevent simultaneous interaction between both adsorbers and the vacuum surge tank. Compared to the basic cycle, the cocurrent displacement cycle can provide higher throughput and higher purity product—a surprising result since throughput and product purity are usually inversely related.

Two-adsorber operation is preferred, as it provides continuous utilization of vacuum equipment. Two-adsorber operation with partial cocurrent displacement is particularly preferred, as it provides continuous utilization of vacuum equipment and continuous production of heavy component product, in addition to higher throughput.

Figure 7:
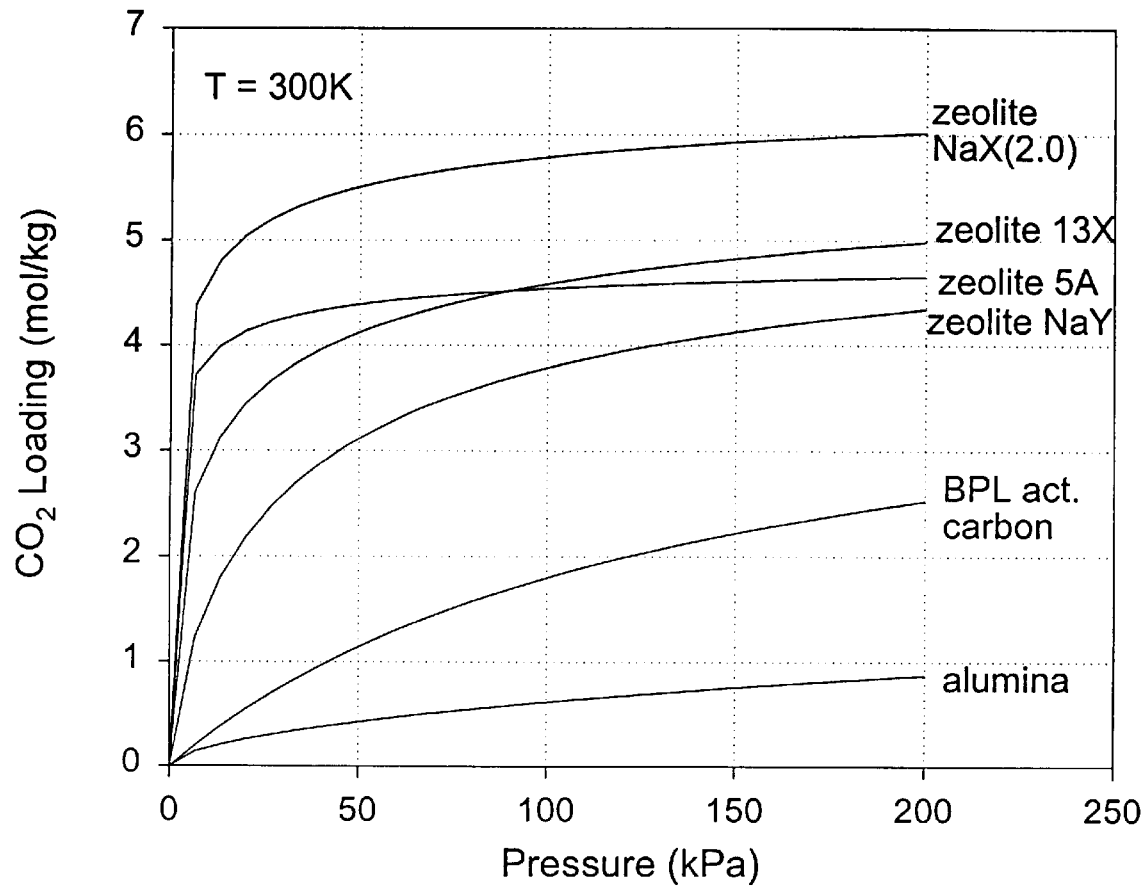
FIG. 7 is a graph of the $CO_2$ adsorption isotherms at different pressures for various adsorbents.
Figure 8:
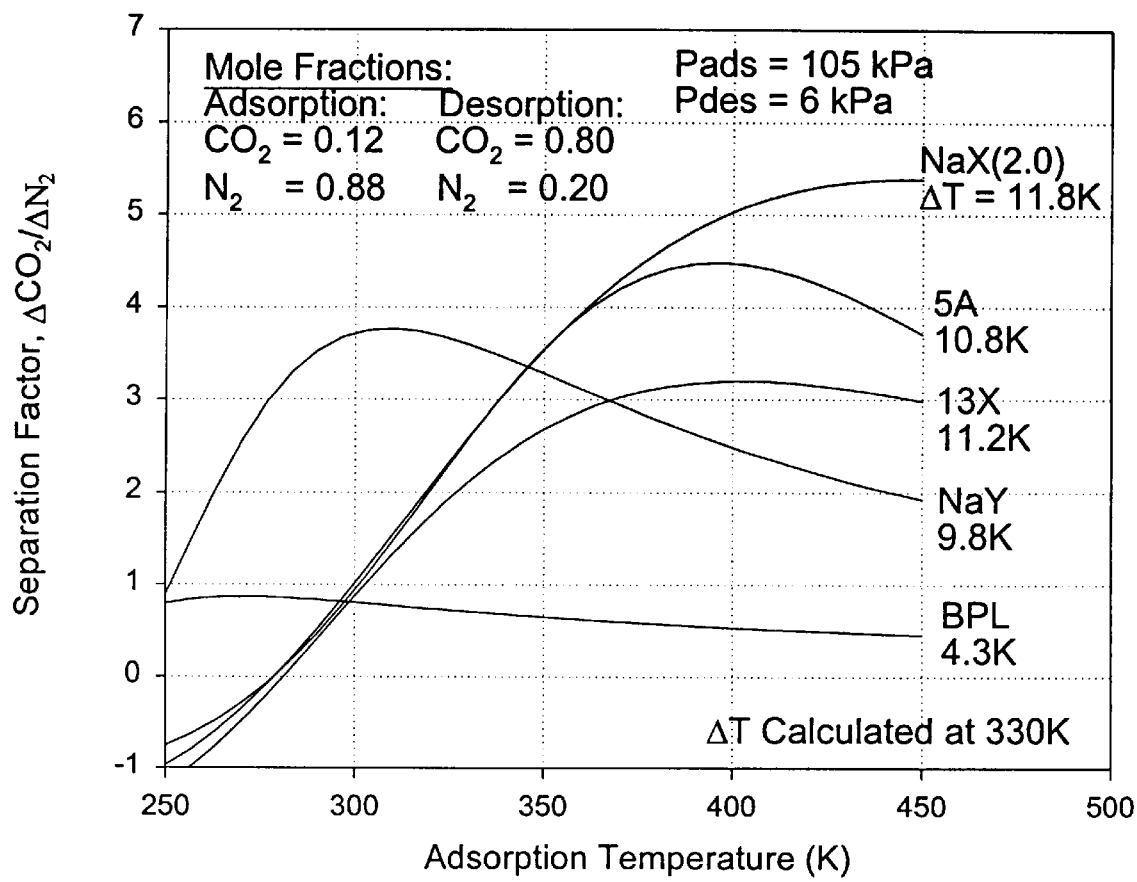
FIG. 8 is a graph of the variation in adiabatic separation factors for various adsorbents at different adsorption temperatures.
Figure 9:
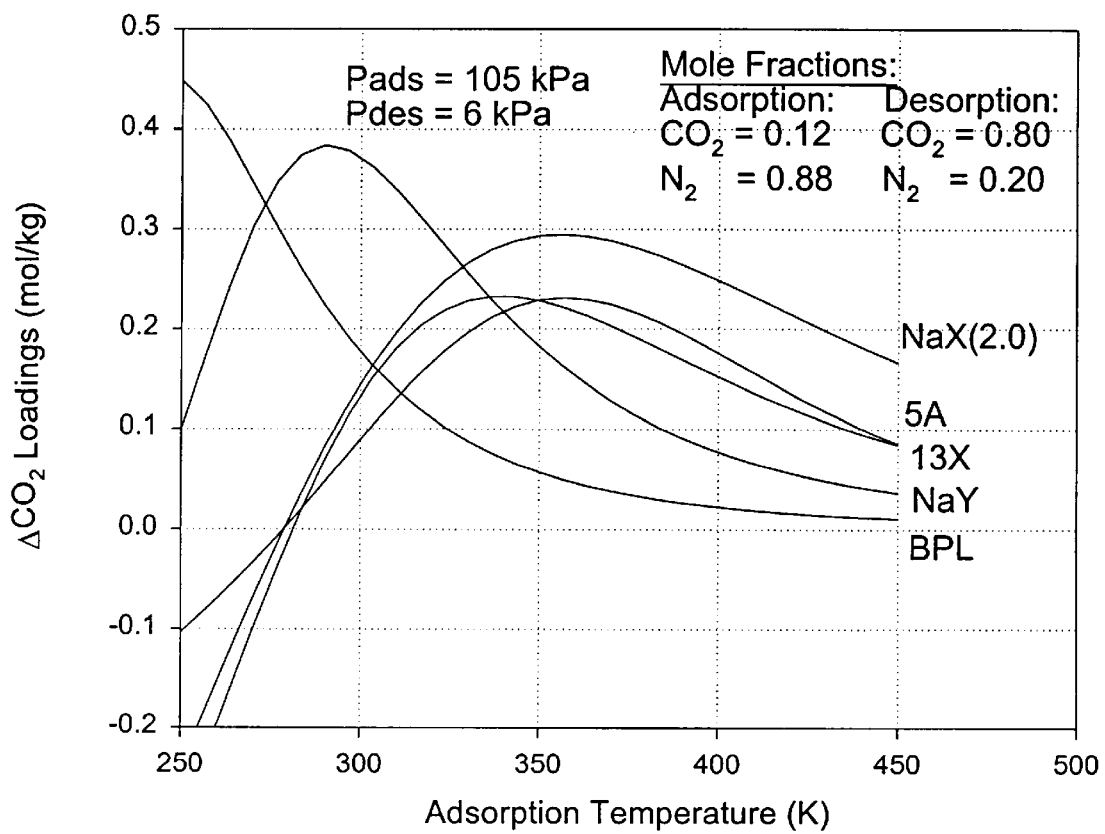
FIG. 9 is a graph of the variation of dynamic $CO_2$ loading ($\Delta CO_2$) characteristics of various adsorbents at different adsorption temperatures.

Adsorbents Utilized (FIGS. 7–9)

Adsorbents useful in the practice of the present invention include the known types of molecular sieve adsorbents, such as those of the zeolite A, X and Y types disclosed, for example, in Milton U.S. Pat. Nos. 2,882,243 and 2,882,244.

The adsorbent(s) utilized are chosen to maximize both the degree of dynamic loading of the heavy component on the adsorbent under the adsorption pressure, temperature and composition, and the degree of separation at the conclusion of the adsorption/desorption cycle between the heavy component to be recovered from the multi-component gas mixture and the lighter component or components thereof. The adsorbent may be provided in a single bed, or in multi-layer adsorbent beds such as described in copending application Ser. No. 08/837,411, filed Apr. 17, 1997 now U.S. Pat. No. 6,152,991.

The most preferred adsorber configuration comprises a pretreatment layer plus a main adsorbent layer in the adsorber or adsorbers utilized. One or more adsorbents may be contained in each layer. The pretreatment layer is located nearest the feed inlet and its purpose is to remove any undesirable contaminants from the feed stream. Typical contaminants include water, $SO_x$, $NO_x$, and other strongly adsorbed species. Those skilled in the art will appreciate the use of zeolites, activated alumina, silica gel as well as other appropriate adsorbents in the pretreatment zone. The pretreatment zone may be eliminated if there are no contaminants in the feed stream.

The most preferred adsorption pressure is near ambient or slightly above to provide reduced power consumption, particularly for low concentrations of the heavy component in the feed. The preferred desorption pressure is sub-atmospheric pressure. The most preferred desorption pressure is below the partial pressure of heavy component in the feed.

For $CO_2$ production from combustion flue gas, lime-kiln gas, $H_2$ plant tail gas and other sources, the duty of the primary adsorbent(s) is to selectively adsorb $CO_2$ while allowing lighter components to pass through. Although $CO_2$ adsorbs strongly on most porous adsorbents, particularly in comparison to many other permanent gases, the strength of adsorption is quite variable.

FIG. 7 presents pure component isotherms at approximately 27° C. (300° K.) for $CO_2$ adsorption on several adsorbents. These isotherms demonstrate the varying degree of interaction of $CO_2$ with solid adsorbents, ranging from weak (e.g., on alumina) to very strong (e.g., on zeolite 5A). The strength of adsorption is primarily indicated by the slope of the isotherms at low pressure. For zeolite 5A, the equilibrium loading at 20 kPa is roughly 90 percent of the equilibrium loading at 200 kPa. Steep isotherms such as this require very low desorption pressures in order to adequately desorb $CO_2$ and to achieve good $CO_2$ working capacity or dynamic loading between the adsorption and desorption steps. The minimal change in loading at higher pressures discourages feed compression. Isotherms with less significant slopes at lower pressure may make compression more favorable.

The performance of adsorbents in a cyclic PSA process is strongly related to the ratio of the dynamic loadings of the strongly held and weakly held components. This ratio, computed as an adiabatic separation factor, is most accurately calculated from process simulation results by integration of the light and heavy component loadings on the adsorbent bed at the end of the adsorption and desorption stages. A reasonable equilibrium approximation of this separation factor can be made directly from isotherms. Initially, the temperature of the feed, gas mixture, and the pressure and gas phase compositions at the end of adsorption and the end of desorption are chosen. Once these conditions have been specified, the corresponding adiabatic temperature rise for each adsorbent is then determined by experiment or by iterative solution of a simplified energy balance. Application of the adiabatic separation factor analysis is described in the above-referenced U.S. Pat. No. 6,152,991 which is incorporated herein by reference.

The most preferred adsorption pressures utilized in the practice of this invention for $CO_2$ recovery from flue gas are near ambient pressure so as to minimize unnecessary compression of waste gas. The adsorbers can be economically evacuated to as low as 6 kPa with standard vacuum equipment, so that value is chosen as the minimum desorption pressure. A feed composition of 12% $CO_2$ and 88% $N_2$ is selected as representative of a typical flue gas stream. A desired product purity of 80% $CO_2$ is chosen for this analysis. The results of the adiabatic separation factor analysis based on the foregoing factors are presented in FIG. 8. These results show the approximate variation in equilibrium adiabatic separation factor as a function of temperature in the bed at the end of the adsorption step, for various adsorbents of potential interest. Each adsorbent is characterized by a different thermal swing ($\Delta T$) that occurs between the adsorption and desorption steps. Zeolite NaY adsorbent maintains moderate capacity and selectivity for $CO_2$ yet can be regenerated at modest conditions, and provides a significant improvement over prior art adsorbents. At a feed temperature of 330° K., the separation factor for zeolite NaY is approximately 4 times greater than that of BPL activated carbon. For moderate feed temperatures (up to 350° K.), zeolite NaY offers an advantage in $CO_2$ selectivity over the other prior art adsorbents noted.

Depending on the source and proximity of the $CO_2$ PSA plant to the flue gas or other multi-component feed gas mixture, the flue gas may be available at higher temperatures. As adsorption temperatures increase, the stronger adsorbents for $CO_2$ are preferred as their isotherms become less steep and more linear. At higher temperatures (greater than 370° K.), the performance for zeolite 13X can exceed that of zeolite NaY. However, zeolite NaX (2.0), or NaX zeolite with a $SiO_2/Al_2O_3$ ratio equal to 2.0, demonstrates substantially improved performance as compared with zeolite 13X or NaX (2.5). The additional cation sites that are provided by the lower Si/Al ratio provide NaX (2.0) with significantly higher capacity for $CO_2$ and increased separation factors. At temperatures above 350° K., the results shown in FIG. 8 demonstrate that NaX (2.0) is a superior adsorbent in comparison to the other noted prior art adsorbents.

Adiabatic separation factors characterize the selectivity of the adsorbents and give a relative measure of the recovery and purity that can be achieved with the process cycle conditions. The change in $CO_2$ loading between the adsorption and desorption stages provides a relative measure of the productivity of the adsorbent. In other words, it determines how much adsorbent will be required for a given $CO_2$ production rate (referred to as bed size factor). Variations in these dynamic loadings with different adsorbents are presented in FIG. 9. At lower temperatures, zeolite NaY has the highest dynamic loading and hence the smallest bed size factor. At higher temperatures, zeolite NaX (2.0) offers the smallest bed size factor. Smaller bed size factors allow the quantity of adsorbent and the adsorber size to be reduced, providing cost reduction in comparison to the prior art.

As indicated above, the characteristics of those adsorbents useful in the practice of the present invention will depend upon the pressure, temperature and compositions of the heavy and light gas components in the adsorption and desorption steps of the process. In the recovery of $CO_2$ it is preferred to utilize zeolite adsorbents having an adiabatic separation factor, $\Delta CO_2/\Delta N_2$, in excess of about 2 and a dynamic $CO_2$ loading in excess of 0.1 mol/kg, at adsorption temperatures of about 300 to 400° K. and under adsorption pressures of about 90 to 200 kPa.

The two most preferred adsorbents for $CO_2$ recovery, zeolite NaY and zeolite NaX (2.0) offer significant potential improvement over adsorbents traditionally employed in the prior art. For a typical flue gas feed, zeolite NaY has the highest separation factor and highest $CO_2$ working capacity at moderate adsorption temperatures (less than 340° K.). At elevated temperatures NaX (2.0) offers higher separation factors while maintaining relatively high $CO_2$ working capacity. These adsorbents may be employed as the main adsorbent layer in the PSA process of the present invention or other pressure swing, vacuum swing or vacuum/pressure swing processes for $CO_2$ recovery from mixtures with a variety of more weakly adsorbed components such as nitrogen, oxygen, hydrogen, methane, or carbon monoxide.

EXAMPLES

Simulation and pilot plant experiments have been used to verify performance of the process and adsorbents of this invention for recovery of $CO_2$.

Examples 1 and 2

Representative examples involve the use of zeolite NaY to recover approximately 80% $CO_2$ product from flue gas containing 12% $CO_2$ and 88% $N_2$. Simulation results for the two-bed basic cycle and the two-bed cocurrent displacement cycle are presented in Table III below. The basic cycle produces 80% product purity at a recovery of 66%. Recovery is defined herein as the fraction of $CO_2$ in the feed that is recovered as product. The bed size factor (BSF) of 341 pounds of zeolite NaY per metric ton per day of contained $CO_2$ product (lb/mtpd) was achieved for this example. Higher recovery and productivity are obtained by utilizing the two-bed cocurrent displacement cycle of the present invention. With cocurrent displacement, product recovery increases to 75% while the BSF decreases to 319 pounds of zeolite NaY per metric ton per day of product.

TABLE III

| Feed: 12% $CO_2$, 88% $N_2$ Adsorbent: NaY zeolite | Basic Cycle (Example 1) | Cocurrent Displacement Cycle (Example 2) |
| --- | --- | --- |
| Product Purity (% $CO_2$) | 80 | 80 |
| Recovery (%) | 66 | 75 |
| Bed Size Factor (lb/mtpd) | 341 | 319 |
| Cycle Time (sec) | 92 | 98 |

Examples 3 and 4

Additional representative examples involve the use of zeolite NaY in a process to recover approximately 92% $CO_2$ product from a hydrogen plant tail gas stream containing 54% $CO_2$, 16% $CH_4$ and 30% $H_2$. Simulation results for the two-bed basic cycle and two-bed cocurrent displacement cycle are presented in Table IV. The basic cycle produces 92% $CO_2$ product at a recovery of 87%. The bed size factor is 228 lb/mtpd. Higher recovery and slightly higher productivity are obtained by utilizing the two-bed cocurrent displacement cycle. With this cycle, product recovery increases to 92% while the bed size factor is essentially unchanged at 227 lb/mtpd.

TABLE IV

| Feed: 54% $CO_2$, 30% $H_2$ 16% $CH_4$ Adsorbent: NaY zeolite | Basic Cycle (Example 3) | Cocurrent Displacement Cycle (Example 4) |
| --- | --- | --- |
| Product Purity (% $CO_2$) | 92 | 92 |
| Recovery (%) | 87 | 92 |
| Bed Size Factor (lb/mtpd) | 228 | 227 |
| Cycle Time (sec) | 194 | 196 |

It will be understood that various changes may be made in the process and apparatus described above or illustrated in the accompanying drawings without departing from the scope of the present invention. Thus, the process, although preferably operated with two adsorbers and one or more storage tanks of any desired configuration, i.e., either constant volume or constant pressure tanks, may utilize more than two adsorbers and multiple storage tanks. Moreover, the invention may be employed with axial flow, radial flow, lateral flow or other flow patterns through the adsorbers. With respect to the individual adsorbers, each may comprise multiple main adsorbent layers, either without any or with one or more pretreatment layers for the adsorption of other components, e.g., water vapor. Also, each adsorbent layer may contain a single adsorbent or a mixture of two or more adsorbents.

In addition, although preferably operated at adsorption pressures near ambient pressure, the adsorption pressure may be at or above atmospheric pressure. Similarly, the minimum desorption pressure may be above, at or below atmospheric pressure.

Nor are the processes disclosed in this invention limited to the use of zeolite NaY, zeolite NaX (2.0) or any other specific adsorbent as the primary adsorbent for $CO_2$ recovery. These processes could be used for $CO_2$ recovery with other adsorbents deployed in one or more main adsorbent layers. The adiabatic separation factor method used to evaluate and select adsorbents for $CO_2$ recovery is general and may be applied equally well to other multi-component separations.

Although this invention is primarily addressed to $CO_2$ recovery from multi-component feed streams, the concepts disclosed herein can be applied to many other separations. Thus, the processes disclosed may be used for other multi-component separations, with any combination of appropriate adsorbents in which the more selectively adsorbed component is a desired product. This includes, but is not limited to, nitrogen recovery from air using nitrogen-selective adsorbents, oxygen recovery from air using oxygen-selective adsorbents, carbon monoxide recovery from syngas using CO-selective adsorbents, and oxygen/argon separation using either oxygen-selective or argon-selective adsorbents. Additionally, this invention may be used for co-production of both light and heavy products, for example, the production of enriched $N_2$ and enriched $CO_2$ from flue gas, or enriched $N_2$ and $O_2$ from air.

Accordingly, specific features of the present invention are shown in one or more of the drawings or disclosed as illustrative above for convenience only, as such features may be combined with other features in accordance with the invention. Those skilled in the art will recognize other embodiments which may be utilized in the practice of the invention and which are intended to be included within the scope of the claims appended hereto.

What is claimed is:

1. A pressure swing adsorption process for the recovery of at least a heavy gas component from a multi-component gas mixture that includes said heavy gas and one or more light gas components, which comprises:

(1) feeding the multi-component gas mixture into an inlet of and through at least one adsorber and at an adsorption pressure, adsorbing the heavy component of the gas mixture on an adsorbent within the adsorber and removing an effluent enriched with the light component or components of the mixture from the adsorber through an outlet thereof, at least a portion of the light component-enriched effluent being retained in a pressure zone communicating with the adsorber outlet;

(2) blowing down a portion of the light component-enriched effluent cocurrently through the adsorber outlet into a vacuum zone maintained at a pressure less than said adsorption pressure and communicating with the adsorber and, at the same time, removing desorbed gas by countercurrent evacuation from the adsorber through the adsorber inlet, to simultaneously depressurize the adsorber cocurrently from its outlet and countercurrently from its inlet;

(3) terminating the flow of the blowdown gas through the adsorber outlet while continuing the countercurrent evacuation of the desorbed gas from the adsorber inlet to further depressurize the adsorber until the pressure in the adsorber is less than that in the vacuum zone;

(4) passing the blowdown gas as a purge gas stream from the vacuum zone to the adsorber outlet countercurrently to and through the adsorber to make and recover a product stream enriched in the heavy gas component;

(5) terminating the flow of the blowdown gas from the vacuum zone and passing said light component-enriched effluent from the pressure zone into the outlet of the adsorber to partially repressurize the adsorber;

(6) passing an additional portion of the multi-component feed gas mixture into the inlet of the adsorber to complete repressurization of the adsorber; and (7) repeating the foregoing steps to produce the heavy component-containing product stream.

2. The pressure swing adsorption process of claim 1, wherein said adsorption pressure is at about atmospheric pressure.

3. The pressure swing adsorption process of claim 1, wherein $CO_2$ is the heavy gas component recovered, and nitrogen, oxygen, hydrogen, methane, carbon monoxide or other light gases are said light gas component(s) contained in the mixture from which the $CO_2$ is separated.

4. The pressure swing adsorption process of claim 3, wherein at least one adsorbent utilized in step (2) has an adiabatic separation factor $\Delta CO_2/\Delta N_2$ in excess of 2.0 and a dynamic $CO_2$ loading in excess of 0.1 mole/kg, at adsorption temperatures of from 300° to 400° K. and under adsorption operating pressures of approximately atmospheric pressure, when the $CO_2$ feed concentration, product concentration and desorption pressure are as set forth in FIG. 8.

5. The pressure swing adsorption process of claim 3, wherein the adsorbent is zeolite NaY or NaX (2.0).

6. The pressure swing adsorption process of claim 1, wherein two or more adsorbers are used.

7. The pressure swing adsorption process of claim 6, wherein portions of the multi-component gas mixture are fed in staged sequence through the respective adsorbers.

8. The pressure swing adsorption process of claim 7, wherein portions of the multi-component gas mixture are fed through two adsorbers and the adsorbers are operated in sequence in accordance with the cycle shown in FIG. 2 of the drawing.

9. The pressure swing adsorption process of claim 6, wherein portions of the multi-component gas mixture are simultaneously fed through the respective adsorbers and steps (2)–(7) are simultaneously carried out in each adsorber.

10. The pressure swing adsorption process of claim 1, wherein at least a portion of the product stream recovered in step (4) is thereafter recycled to the inlet of the adsorber to effect cocurrent displacement of the gas mixture at the inlet and thereby increase the concentration of the heavy component at the inlet after step (1) of the process.

11. The pressure swing adsorption process of claim 1, wherein the flow rate of the purge gas stream in step (4) is controlled during the product make step to provide substantially constant purity of the heavy component-containing product stream.

12. The pressure swing adsorption process of claim 1 wherein, after terminating the flow of blowdown gas to make the product stream in step (4), additional blowdown gas from the vacuum zone is passed into the adsorber outlet to augment countercurrent repressurization of the adsorber.

13. A process for the recovery of at least $CO_2$ from a multi-component gas mixture containing a less selectively adsorbable component or components selected from nitrogen, oxygen, hydrogen, methane and/or carbon monoxide, wherein the gas mixture is contacted in at least one adsorber containing adsorbent material selective for the adsorption of $CO_2$ by means of cyclic steps comprising:

(a) adsorption, during which the gas mixture is passed into said adsorber in contact with the adsorbent at an adsorption temperature of 300° to 400 K and under an adsorption pressure of 90 to 200 kPa, and the $CO_2$ is selectively adsorbed by the adsorbent;

(b) desorption during which the passage of the gas mixture into said adsorber is discontinued, and the pressure in said adsorber is reduced from the adsorption pressure to a lower desorption pressure to desorb the $CO_2$ from said adsorbent; and (c) recovering a product stream from said adsorber containing the $CO_2$ in at least a predetermined, constant purity;

wherein the adsorbent has an adiabatic separation factor $\Delta CO_2/\Delta N_2$ in excess of 2.0 and a dynamic $CO_2$ loading in excess of 0.1 mole/kg at said adsorption temperature and pressure, when the $CO_2$ feed concentration, product concentration and desorption pressure are as set forth in FIG. 8.

14. The process of claim 13, wherein said adsorber is simultaneously depressurized by the passage of streams enriched in the less selectively adsorbable component or components, cocurrently from an outlet and countercurrently from an inlet of said adsorber re-using the cocurrent depressurization stream as a purge gas stream in step (b) and recovering the $CO_2$-containing product stream from said inlet of the said adsorber.

15. The pressure swing adsorption process of claim 14, wherein at least a portion of the product stream recovered in step (b) is thereafter recycled to the inlet of the adsorber to effect cocurrent displacement of the gas mixture at the inlet and thereby increase the concentration of said $CO_2$ at the inlet after step (a) of the process.

16. The process of claim 13, wherein the adsorbent is zeolite NaY or NaX (2.0).

17. An apparatus for carrying out a pressure swing adsorption process for the recovery of a heavy gas component in a multi-component gas mixture containing said heavy gas component and at least one light component, which comprises:

(1) at least one adsorber having an inlet end and an outlet end and incorporating at least one layer of an adsorbent capable of selectively adsorbing the heavy component of the gas mixture relative to said at least one light component thereof;

(2) a feed blower communicating with the inlet end of the adsorber for feeding the gas mixture into and through the adsorber;

(3) a pressure tank communicating with the outlet end of the adsorber for receiving a light component-enriched effluent from the adsorber and for feeding the light component-enriched effluent into the outlet end of the adsorber;

(4) a vacuum tank communicating with the outlet end of the adsorber for receiving a further portion of the light component-enriched effluent from the adsorber and for feeding the light component-enriched effluent as a blowdown gas in the adsorber through its outlet end;

(5) outlet valve means for selectively placing the pressure and vacuum tanks in communication with the outlet end of the adsorber for depressurizing and repressurizing the adsorber;

(6) a vacuum pump independent of the feed blower and communicating with the inlet end of the adsorber for removing a product stream containing the heavy component of the gas mixture at a predetermined, constant concentration;

(7) inlet valve means for selectively placing the feed blower and the vacuum pump in communication with the inlet end of the adsorber to facilitate feed of the gas mixture into and removal of the product stream from the inlet end of the adsorber; and (8) control means for concurrently actuating the outlet valve means and the inlet valve means to facilitate feed of the light component-enriched effluent as a blowdown gas from the vacuum tank into the adsorber and removal of an evacuation stream from the adsorber, to simultaneously depressurize the adsorber cocurrently from its outlet end and countercurrently from its inlet end.

18. The pressure swing adsorption apparatus of claim 17, said apparatus comprising two adsorbers, which are so connected to the pressure tank, vacuum tank and vacuum pump by said inlet and outlet valve means and control means as to sequentially adsorb and desorb the heavy gas component and thereby provide a continuous flow of product containing the predetermined concentration of said component.

19. The pressure swing adsorption apparatus of claim 17, further comprising a storage tank communicating with the discharge from the vacuum pump and the inlet side of the feed blower for feeding a portion of the product stream into the inlet of the adsorber to effect cocurrent displacement of the gas mixture at the inlet.

20. The variable pressure swing adsorption apparatus of claim 17, wherein the adsorbent is zeolite NaY or NaX (2.0).

* * * * *